US012159560B2

(12) United States Patent
Van Wiemeersch et al.

(10) Patent No.: US 12,159,560 B2
(45) Date of Patent: Dec. 3, 2024

(54) PROJECTOR POWER MANAGEMENT FOR HEAD-UP DISPLAYS

(71) Applicant: Ford Global Technologies, LLC, Dearborn, MI (US)

(72) Inventors: John Robert Van Wiemeersch, Novi, MI (US); Brendan Francis Diamond, Grosse Pointe, MI (US); Stuart C. Salter, White Lake, MI (US); Ryan Joseph Gorski, Grosse Pointe Farms, MI (US); Mahmoud Y. Ghannam, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 18/187,962

(22) Filed: Mar. 22, 2023

(65) Prior Publication Data

US 2024/0321152 A1 Sep. 26, 2024

(51) Int. Cl.
*G09G 3/00* (2006.01)
*B60K 35/00* (2006.01)
(Continued)

(52) U.S. Cl.
CPC .............. *G09G 3/002* (2013.01); *B60K 35/00* (2013.01); *B60K 35/23* (2024.01); *B60K 35/65* (2024.01); *G06F 3/013* (2013.01); *G09G 2330/023* (2013.01); *G09G 2354/00* (2013.01); *G09G 2380/10* (2013.01)

(58) Field of Classification Search
CPC .............. G09G 3/002; G09G 2330/023; G09G 2354/00; G09G 2380/10; B60K 35/00; B60K 2370/1529; B60K 2370/73; G06F 3/013

See application file for complete search history.

(56) References Cited

U.S. PATENT DOCUMENTS 8,403,490 B2    3/2013    Sugiyama et al.
9,097,890 B2    8/2015    Miller et al.
(Continued)

FOREIGN PATENT DOCUMENTS

CN    105301774 A    2/2016
CN    109212753 B    1/2021
(Continued)

OTHER PUBLICATIONS

Brown, "Adjusted Minimum Time-To-Collision(TTC): A Robust Approach to Evaluating Crash Scenarios", DSC 200-5 North America—Orlando—Nov. 2005.

(Continued)

*Primary Examiner* — Christopher E Leiby
(74) *Attorney, Agent, or Firm* — Frank Lollo; Bejin Bieneman PLC

(57) ABSTRACT

Apparatus and methods for managing HUD power in vehicle head up displays are disclosed. State indications are stored. Based on the state indications a determination is made as to whether a HUD power control condition is met. If a HUD power control condition is met a corresponding HUD power control action is determined. A set of HUD power control commands corresponding to the HUD power control action is sent to the HUD to control the HUD to take the power control action.

18 Claims, 10 Drawing Sheets

(51) Int. Cl.
  *B60K 35/23*  (2024.01)
  *B60K 35/65*  (2024.01)
  *G06F 3/01*  (2006.01)

(56) References Cited

U.S. PATENT DOCUMENTS

| | | | |
|---|---|---|---|
| 9,212,926 | B2 | 12/2015 | Attard et al. |
| 9,851,565 | B1 | 12/2017 | Miao |
| 10,302,943 | B2 | 5/2019 | Asai |
| 11,181,743 | B2 | 11/2021 | Nakada et al. |
| 11,420,680 | B2 | 8/2022 | Wall et al. |
| 2007/0159410 | A1* | 7/2007 | Yamamoto ........... G09G 3/3406 345/1.1 |
| 2013/0145360 | A1* | 6/2013 | Ricci ........... G06F 17/00 717/174 |
| 2017/0269684 | A1* | 9/2017 | Murai ........... B60R 1/00 |
| 2018/0012089 | A1* | 1/2018 | Ricci ........... H01Q 1/3291 |
| 2018/0281856 | A1 | 10/2018 | Talamonti et al. |
| 2019/0339535 | A1 | 11/2019 | Abi-Chaaya et al. |
| 2021/0165220 | A1* | 6/2021 | Nakada ........... B60K 35/00 |
| 2021/0397247 | A1* | 12/2021 | Wieczorek ........... G06V 40/19 |
| 2022/0009492 | A1 | 1/2022 | Adwan |
| 2022/0274646 | A1 | 9/2022 | Shimanaka et al. |

FOREIGN PATENT DOCUMENTS

| | | |
|---|---|---|
| DE | 102007025531 A1 | 12/2008 |
| DE | 102015215180 A1 | 2/2017 |
| DE | 102021209616 B3 | 7/2022 |
| JP | 4481187 B2 | 6/2010 |
| JP | 202124402 A | 2/2021 |
| JP | 202226522 A | 2/2022 |
| KR | 20170056750 A | 5/2017 |
| WO | 2021122891 A1 | 6/2021 |
| WO | 2021218602 A1 | 11/2021 |

OTHER PUBLICATIONS

Ceres Holographics, Texas Instruments and Ceres Holographics Demonstrate Automotive-qualified Holographic-Enabled Transparent Display Solutions, Joint Solution Presented at the Society of Information Display (SID) Vehicles Displays Detroit Virtual Event, Oct. 14, 2020.

Jeffrey, "Study suggests that HUD tech may actually reduce driving safety", Jun. 29, 2015, https://newatlas.com/hud-technology-driving-sasfety/38204/.

Lefèvre et al., "A survey on motion prediction and risk assessment for intelligent vehicles", Lefèvre et al. Robomech Journal 2014, 1:1, http://www.robomechjournal.com/content/1/1/1.

Pauzie, "Head Up Display in Automotive: A New Reality for the Driver", International Conference of Design, User Experience, and Usability, DUXU 2015, https://link.springer.com/chapter/10.1007/978-3-319-20889-3_47.

Pavel et al., "Vision-Based Autonomous Vehicle Systems Based on Deep Learning: A Systematic Literature Review", Appl. Sci. 2022, 12, 6831. https://doi.org/10.3390/app12146831, https://www.mdpi.com/journal/applsci.

* cited by examiner

PROJECTOR POWER MANAGEMENT FOR HEAD-UP DISPLAYS

BACKGROUND

Advanced driver assistance technologies such as head-up displays (HUD) are increasingly being included in new vehicles. A HUD can allow drivers to privately view information in a vehicle. HUDs provide significant benefits, even as they increase the electrical load on a vehicle's power source. As electrical load increases, fuel economy or electrical power train battery charge decreases and thus vehicle range decrease.

DETAILED DESCRIPTION

Figure 1:
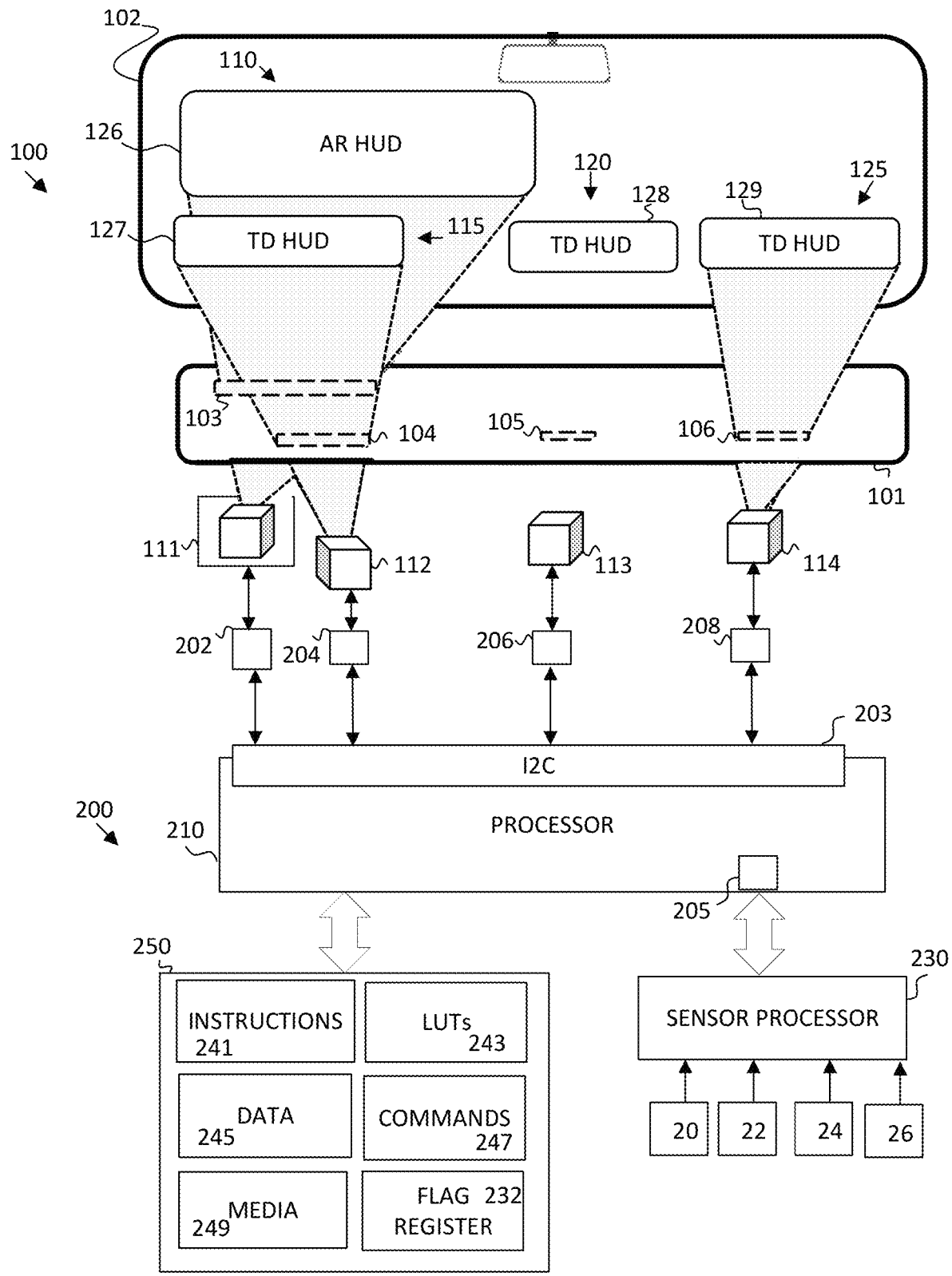
FIG. 1 is a block diagram of an example apparatus according to the disclosure implemented in an example head up display (HUD) system comprising head-up displays (HUDs)

With reference to the drawing Figures, wherein like numerals indicate like parts throughout the several views, apparatus and methods for managing HUD power consumption in vehicles equipped with HUDs are disclosed and described herein. For purposes of this disclosure, each HUD includes at least one illumination source, at least one transparent display screen (also referred to herein as information plane) and at least one controller for controlling the illumination source. HUDs can privately provide information to a vehicle user. However, under some conditions, illumination sources of HUDs can consume significant amounts of power. For example, whenever a vehicle is "ON" or in an 'accessory' mode a HUD draws current from the vehicle's power source to drive the illumination source of the HUD. In some situations, such power consumption may be unnecessary. For example, if no vehicle occupant is viewing the HUD display and the vehicle is in park, the image may not be needed. In that case, HUD power is wasted in presenting an image. Thus, one way to control HUD power is to control the amount of power drawn by or provided to its illumination source.

An example apparatus comprises a processor and a memory coupled to the processor. The memory stores processor-executable instructions that configure the processor to store state indications for a vehicle equipped with a HUD system comprising a plurality of HUDs. Based on the state indications, the processor is configured to determine whether a power control condition is met for controlling an illumination source of any of the HUDs. If a power control condition is met for a HUD the processor is configured to determine a corresponding power control action for the HUD illumination source. The processor is configured to retrieve a set of stored power control commands corresponding to the power control action and to send the set of power control commands to a controller of the illumination source of the HUD to control the illumination source in accordance with the corresponding power control action. If no power control condition is met for any HUD illumination source, the processor does not send a set of power control commands to the HUD illumination source, and control of the illumination source proceeds under its default settings.

An apparatus within the scope of the disclosure includes the processor configured to receive sensor data provided by a plurality of sensors disposed in the vehicle and to set the state indications based on the received sensor data.

An apparatus within the scope of the disclosure includes a flag register configured to store the state indications as set or cleared flags.

An apparatus within the scope of the disclosure includes the processor configured to map each of a predetermined number of possible flag patterns in the flag register to a corresponding control condition of a finite predetermined number of possible control conditions for controlling power to the HUDs.

An apparatus within the scope of the disclosure includes the processor configured to map each of the finite number of possible control conditions to one of a predetermined number of possible control actions for each of the HUDs.

An apparatus within the scope of the disclosure includes the processor configured to map each of the predetermined number of possible power control actions to a corresponding one of a predetermined number of power control command sets.

An apparatus within the scope of the disclosure includes the processor configured to send power control command sets to the HUDs.

An apparatus within the scope of the disclosure includes the processor configured to receive a user defined control condition as a combination of set and cleared flags, and to map the control condition to a corresponding user selected power control condition of the plurality of power control conditions.

An apparatus within the scope of the disclosure includes the processor configured to recognize states indicated by the flags, the states including at least one of: seat position state, seat occupancy state, vehicle transmission state, occupant head position state and occupant body position state.

An apparatus within the scope of the disclosure includes the processor configured to delay at least one of the plurality of power control actions by a user-configurable delay time.

An example method of the disclosure comprises storing state indications for a vehicle equipped with a head-up display (HUD) system comprising HUDs. Based on the state indications, the method determines whether a power control condition is met for a HUD. If a power control condition is met, the method determines a corresponding power control action for the HUD. A set of stored power control commands is retrieved corresponding to the power control action. The set of power control commands is sent to the HUD to control the HUD to take the corresponding power control action. If no power control condition is met for the HUD, no set of power control commands is sent to the HUD.

Methods within the scope of the disclosure include receiving sensor data provided by a plurality of sensors disposed in the vehicle and setting the power state indications based on the received sensor data.

Methods within the scope of the disclosure include storing the state indications in a flag register as set or cleared flags.

Methods within the scope of the disclosure include mapping each of a predetermined number of possible flag patterns in the flag register to a corresponding power control condition of a predetermined number of possible power control conditions for controlling power to a HUD.

Methods within the scope of the disclosure include mapping each of the predetermined number of possible power control conditions to one of a predetermined number of possible power control actions.

Methods within the scope of the disclosure include mapping each of the predetermined number of possible power control actions to a corresponding one of a predetermined number of power control command sets.

Methods within the scope of the disclosure include sending a power control command set to a HUD.

Methods within the scope of the disclosure include receiving a user defined control condition as a combination of set and cleared flags and mapping the control condition to a corresponding user selected one of the plurality of power control conditions.

FIG. 1 is a block diagram of an example apparatus 200 for managing power consumption of a HUD system 100 installed in a vehicle 10 (best illustrated in FIG. 2). In the example shown in FIG. 1. HUD system 100 comprises four HUDs 110, 115, 120 and 125. It is noted the disclosure is not limited to a particular number of HUDs. HUD systems within the scope of the disclosure may include more or fewer than four HUDs.

Respective HUDs 110, 115, 120 and 125 include respective illumination sources 111, 112, 113, 114 each of which may be controlled respectively by corresponding controllers 202, 204, 206, 208 to project image modulated light onto respective information planes 126, 127, 128, 129. An information plane includes at least a portion of a glazing 102 such as a portion of a vehicle windshield or window, in which is disposed a holographic film.

In the example, HUD 110 includes information plane 126 arranged for viewing by a vehicle user in a driver seat of the vehicle. HUD 115 is an in-plane (IP) HUD comprising illumination source 112 and a portion of glazing 102, also arranged for viewing by the user in the driver seat of the vehicle. HUD 115 may provide cluster information, e.g., information required by regulation, i.e., functional safety information in compliance with ISO 26262. HUD 120 comprises illumination source 113 and information plane 128. Information plane 128 is also arranged for viewing by the user of the vehicle. HUD 120 may be an auxiliary HUD that provides a user of the vehicle with supplemental information on information plane 128. HUD 125 comprises illumination source 114 and a portion of windshield 102 providing information plane 129, which may be configured for viewing by a passenger sitting in a front passenger seat of the vehicle.

In the example of FIG. 1, illumination sources 111-114 can be mounted to a structure of the vehicle. For example, light sources 111-114 can be disposed beneath dashboard 101 and arranged to project light onto corresponding glazing portions, e.g., windshield 102 portions 126, 127, 128 and 129 via corresponding openings 103-106 formed in dashboard 101. Respective light sources 111-114 can be arranged with respect to corresponding respective apertures in dashboard 101 to allow projected light to pass therethrough forward of the user and passenger to illuminate a corresponding portion of windshield 102. In alternative implementations, HUD 110 and driver HUD 115 may share a common aperture, e.g., apertures 103 and 104 can be combined. Further, the driver center HUD 120 may also share the same aperture with the driver HUD 110 and driver TD-HUD 115.

Each information plane 127, 128, 129 includes a holographic optical element (HOE) disposed in a holographic film in which a hologram is recorded. The holographic film is disposed within a portion of the vehicle glazing, e.g., windshield 102. The hologram diffracts light at angles so as to direct the light into a predetermined area, referred to as an 'eyebox' (best illustrated in FIG. 2B at 82). An image conveyed by the projected light is visible to an observer if the observer's eyes are in eyebox 82. If the observer's eyes rotate to focus outside the boundaries of eyebox 82, the diffracted image becomes invisible to the observer. The observer sees only a substantially transparent display screen on the windshield. The area of a given eyebox is specific to the corresponding HUD and is defined by the HUD's optical specifications and arrangement in the vehicle.

HUD 110 is configured to form a virtual image that appears to the viewer to be at the front of the vehicle. The real images provided by HUDs 115, 120 and 125 appear at the plane of the windshield and not in front of the vehicle. in other words, information planes 127, 128 and 129 form real images in the plane of holographic optical elements disposed in the corresponding windshield portions. The images are visible only to a viewer whose eyes are within an eyebox.

In the example of FIG. 1 images projected by HUD 110 and HUD 115 and HUD 120 are viewable by a user sitting in a driver seat of the vehicle, but only when the user's head is within the eyebox. HUD 125 is viewable by an occupant seated in a front passenger seat of the vehicle with their eyes in the eyebox area. While example HUD system 100 shown in FIG. 1 includes four HUDs, other implementations can have fewer than four HUDs or more than four HUDs in any combination of driver virtual HUDs, and IP HUDs. Further, HUD light sources may project images on a HOE disposed within a side or rear glazing of a vehicle. The technology and power reduction strategy taught in this disclosure may apply to any glazing of a vehicle implementing an information plane as described above.

Apparatus 200 includes a processor 210 configured to control HUD system 100 power consumption by controlling one or more respective illumination sources 111, 112, 113, 114 of corresponding respective HUDs 110, 115, 120 and 125. In the example of FIG. 1 processor 210 is configured to control an illumination source by sending control commands to a corresponding illumination source controller 202, 204, 206, 208 respectively. For example, processor 210 is configured to control illumination source 202 of HUD 110 by sending control commands to controller 202 via an I2C (controller to controller) interface 203. In other implementations, processor 210 is configured to directly control one or more illumination sources 111, 112, 113, 114.

Processor 210 is configured to control one or more of illumination sources 111, 112, 113 and 114 by processor 210 taking or more pre-defined power control actions in response to processor 210 detecting one or more corresponding power control conditions are met. A power control condition is pre-defined by naming a condition and associating the named condition with one or more sensed parameters of the vehicle environment.

Vehicle 10 can include a plurality of sensors, e.g., 20, 22, 24, 26 to sense a wide variety of parameters of the vehicle environment. For example, a dynamometer type sensor 20 (shown in FIG. 2B) can sense force (weight) applied to a seat 77 (best illustrated in FIG. 2B). An eye tracker 25 (also shown in FIG. 2B) can sense a position of a user's eyes. A camera can sense a scene, and an image analysis algorithm can 'sense' the scene content. A vehicle electronic control unit (ECU) can sense the status of the vehicle's transmission system, e.g., park, reverse, neutral, drive, low. These are only a few of the many possible types of sensors and vehicle parameters suitable for implementing the apparatus and methods of the disclosure. Of course, the disclosure isn't limited to any particular number of sensors or to any particular type of sensed parameter. Implementations within the scope of the disclosure can include more than four sensors, or fewer than four sensors.

Apparatus 100 can be pre-configured with conditions that can be detected by processor 210. In some implementations, apparatus 100 is configured to enable a user to modify, add or delete conditions. The conditions are defined in terms of particular 'states' of persons or things in the vehicle's environment. In this context a 'state' is a state of being. In other words, it is a state of a person or thing being in one, and only one, of some predetermined number of known possibilities for its being, at some definite point in time.

For example, a single throw, double pole switch can have two possible states of its being. The switch can be thrown. Or the switch can be NOT thrown. A variety of suitable sensors can test the state of a switch's being by testing some parameter correlated with the state of being of the switch. Any conclusion as to the state of being of the switch (at the time of the test) would be drawn based on the results of the test.

Apparatus 200 relies on one or more of sensors 20, 22, 24, 26 to test states of being of particular persons or things in the environment of vehicle 10. If a test shows the states of the persons or things meet a power control condition, processor 210 takes a corresponding power control action.

In many cases one test is not sufficient to draw a conclusion with a desired degree of confidence. For example, a current sensor could test for current flowing through a switch. If no current is detected the results of the test would be negative. On that result, a conclusion could be the switch is not thrown, i.e., it is open. However, that is not necessarily the case. There may be no current through a thrown switch due to failure of the power supply that supplies current to the switch.

For example, a power control action may be appropriate when a human is sitting in a vehicle seat, and not appropriate if there is no human in the seat. A force sensor 20 may test weight on a seat and may detect a weight that is consistent with a human sitting in the seat. A conclusion could be there is a human sitting in the seat. And the power control action could be taken on that conclusion.

However, that conclusion could be wrong because it is based on an inference that the weight is due to the seat being occupied by a human. The sensor itself does not determine whether the weight is due to a human in the seat, or heavy packages on the seat. To address that challenge, apparatus and methods disclosed herein can define a condition in terms of more than one sensor. For example, a power control action might be desired on a condition that a human is sitting in a seat. The condition that a human is sitting in the seat can be defined by specifying two tests, i.e., two sensors to test the relevant environment. The first test could use the force sensor and the second test could use, e.g., an eye or head tracking sensor. The condition could be defined by a positive result from both the force sensor test and the eye tracker test. The condition is met when both test results are positive. In that case the power control action is taken. Otherwise, assuming no other condition is met for taking the power control action, the power control action is not taken.

Alternatively, a condition of taking a power control action might be defined by requirement for a positive result of the force sensor (human sitting in the seat), a positive result of a camera test classifying the object in the seat as a human, and a negative result of an eye tracker test for human eyes directed within some given area. On that basis a conclusion can be reached that there is a human in the seat, and the human is not looking at projected images. If that condition is met, a power control action is taken. For example, the power control action could be specified as the display being dimmed. Alternatively, the power control action could be specified as turning off the HUD or blanking the screen, or any as other specified action that reduces power consumption by the HUD when the condition is met. In that manner, the power can be conserved by not expending it when the human is not observing projected images.

In another example, a user may occasionally stop a vehicle and rest in the driver seat while the vehicle is "ON" or in "Accessory Mode". A user may occupy a vehicle cabin even when the vehicle is not operating or moving. For example, on exceedingly hot or cold days, the user may choose to leave the vehicle "ON" for comfort which will result in the driver TD-HUD being active and possibly the AR-HUD also being active. While some vehicles have an AEIS (Auto Engine Ignition Shutdown) feature for fuel savings, that feature typically does not shut down a vehicle engine until a certain amount of idle time, e.g., 30 minutes of idle time, have passed. The power consumed by the HUD system during idle time can decrease the range (i.e., distance that the vehicle can travel before refueling or recharging) of the vehicle.

As described above, there can be many different conditions under which a power control action is appropriate. To control HUD power based on a complex condition, i.e., one that involves inference, apparatus 200 is configured to define a power control condition in terms of a combination of tests, or sensor outputs.

The apparatus and methods disclosed and described herein are not limited to the particular sensors, combinations of sensors or conditions described in the examples for purposes of explanation. Upon reading the specification, those of ordinary skill will readily recognize a wide variety of sensors could sense a wide variety of relevant states of persons and things within a vehicle relevant to the conservation of power. All such variations are intended to remain within the scope of the disclosure.

Some implementations are configured to enable a user to define one or more conditions under which any of one or more power control actions are taken. For example, in some implementations apparatus 200 is configured to enable a user to define one or more power control actions to be taken for HUD, and one or more conditions for taking a power control action. The user can define the condition in terms of positive or negative results of tests performed by one or more user-selected sensors.

As shown in FIG. 1 power control apparatus 200 comprises a power control processor 210 and a memory 250.

Memory 250 includes an instruction memory 241, one or more look up tables (LUT) 243, data memory 245, command storage 247, media storage 249 and—register 232, which may simply be a location in data memory 245 or an auxiliary memory (not depicted). Instruction memory 241 stores processor executable instructions, which are sequences of machine code instructions in the machine language specified by the instruction set architecture (ISA) of processor 210.

The machine code instructions can be generated using any appropriate programming language, including a variety of compiled and interpreted languages including mark-up languages and scripted languages. When executed by processor 210 the instructions configure processor 210 to perform the processes described herein and depicted in FIGS. 5-11. Memories 241, 232, 245, 247, 249, 232 may reside in the same module as processor 210 or they may be distributed throughout the various modules of vehicle 10 control system and linked by a vehicle communications bus.

Power control processor 210 includes at least one I/O port 205 for communicating with sensors 20-26 to receive sensor data provided by sensors 20, 22, 24, 26. In some implementations, processor 200 may include one or more I/O ports for communicating directly with sensors 20-26. In other implementations, HUD system 100 includes one or more sensor processors 230 configured to pre-process sensor data, and to provide the processed sensor data at an output. In some implementations, sensor processor 230 comprises processor 210, either as an integral part of a processor 210 structure, or as a separate processor structure. Memory 250 can store processor executable instructions that configure processor 210

Figure 2A:
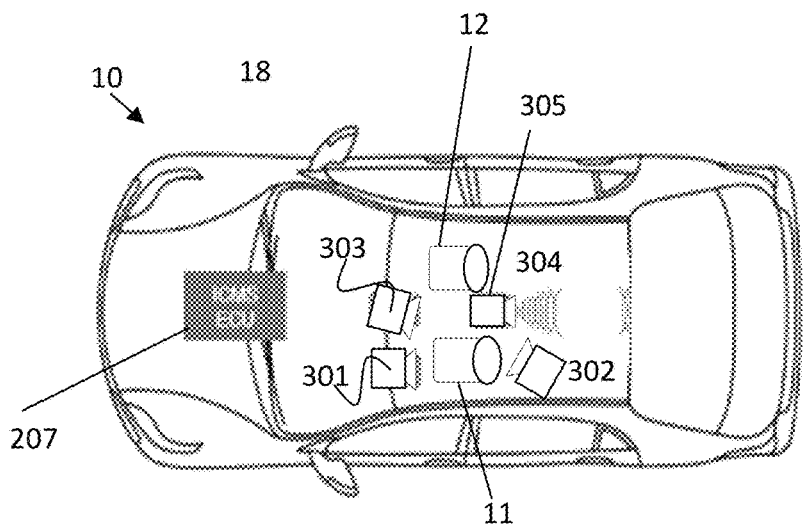
FIG. 2A is a top view of a vehicle showing example sensors disposed therein.

FIG. 2A is a pictorial top plan view of a vehicle 10 equipped with a variety of suitable sensors suitable for implementation of the apparatus and method of the disclosure. For example, vehicle 10 can be equipped with one or more smart cameras 301, 302, 303. Smart cameras 301, 302, 303 can be part of an artificial intelligence (AI)-based interior monitoring system that uses any suitable intelligent image-processing algorithms and machine learning algorithms to teach the camera system to correctly classify image portions as showing particular activities in which a vehicle occupant is engaged. Thus, cameras 301, 302, 303 can detect user states such as drowsiness and distraction, reading a newspaper, writing e-mails, using a smartphone, etc. Cameras 301, 302, 303 can also determine in what position a user or other occupant is sitting. Cameras 301, 302, 303 can be integrated into a steering wheel, or mounted above or below the rear-view mirror to monitor an entire passenger compartment.

As discussed in detail above, smart cameras 301, 302, 303 can provide state indications that can define a condition. For example, as noted above, a seat occupancy sensor may indicate a seat is occupied based on a weight sensor in the seat, i.e., a state of a vehicle seat may be "occupied", However, the seat may be occupied, e.g., by luggage or boxes, etc. To define a condition in which the seat is occupied by a human occupant, a state indication from the seat occupancy sensor together with a state indication from a smart camera can be combined to provide a more precise definition of the condition.

Vehicle 10 can further include an artificial intelligence (AI) based light detection and ranging system (LIDAR) 305 to capture the interior of the vehicle. The pulses that capture the interior allow observation of head and body position as well as the direction of eye gaze. LIDAR sensors can provide visual information about in-cabin behaviors and activities and can count occupants. Vehicle 10 can also include Ultra-Wideband (UWB) sensors to interpret gestures and body motions. State indications from a combination of these sensors can be useful to define various complex conditions within vehicle 10.

Figure 2B:
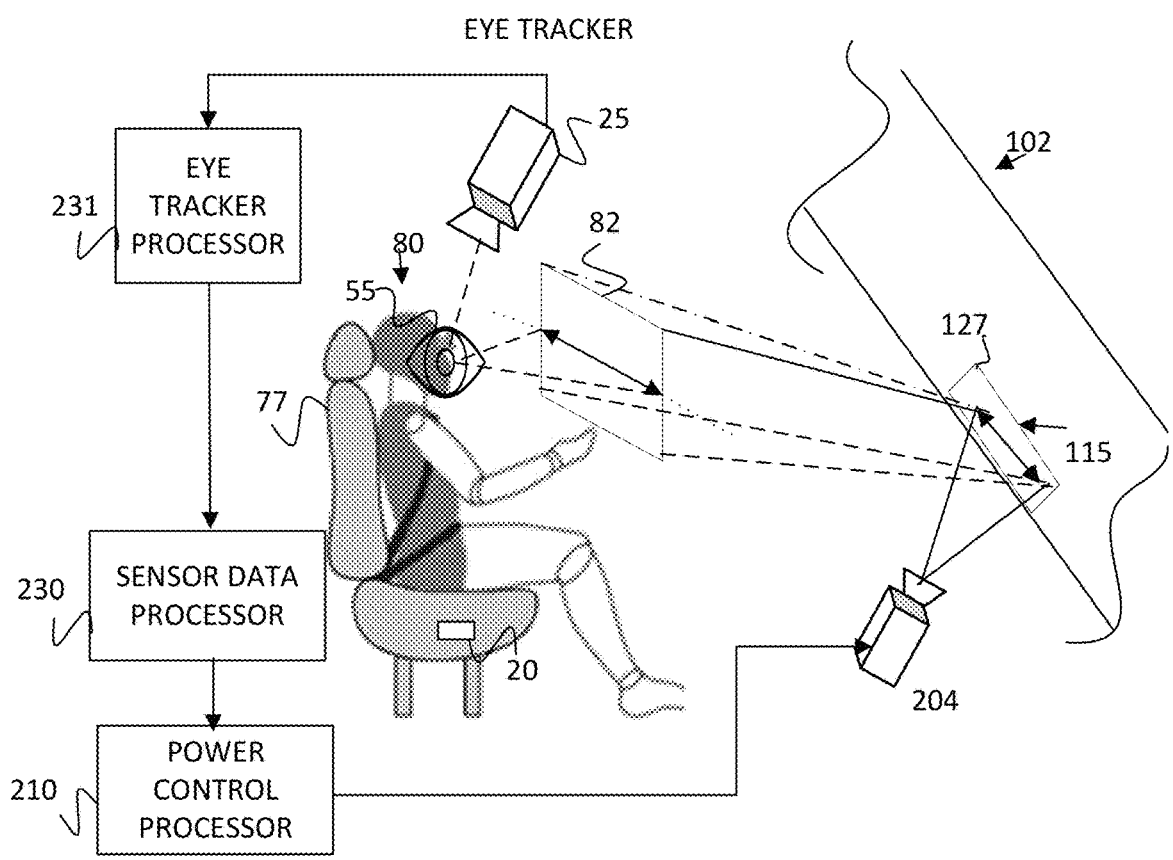
FIG. 2B is a block diagram of an apparatus according to the disclosure.

FIG. 2B is a block diagram showing a power control loop including an eye 55 of a user 80 whose state is sensed by an eye tracking sensor 25. Eye-tracking sensor 25 can be, e.g., a LIDAR or near infra-red device configured to focus an illumination beam at the pupil of eye 55 user 80. Light from the beam is reflected in the user's eye 55. An infrared camera comprising eye-tracking sensor 25 can then record the reflection, delimit the center of the pupil, deduce eye rotation, and determine gaze direction. In some eye tracking sensors, a Pupil Center Corneal Reflection (PCCR) technique is used, in which the pupil and corneal reflections are optically monitored. Parameters of eye 55, e.g., eye position, point of gaze, and eye movements of user 80 can be calculated to determine which of a predetermined number of possible defined states user 80 or user's eye 55 is in at the time of the measurement.

The results can be provided to processor 210 as a positive or negative test result by eye tracking sensor 25 or a processor 235 thereof. Apparatus 200 is configured to define a power control condition in terms of particular results, or a combination of results. Processor 210 can determine whether the condition is met by detecting a positive or negative test result. Processor 210 is configured to take a power control action in response to detecting the power control condition is met.

For example, as discussed above, a holographic optical element (HOE) included with information plane 127 can diffract light into a viewing area referred to as an 'eyebox' 82. If the eye 55 of user 80 rotates to focus outside the boundaries of eyebox 82, the image becomes invisible to user 80. User 80 sees only a substantially transparent information plane on the glazing windshield. In that case it may not be energy efficient to have HUD light source 204 continue to project images. Eye tracker 26 can detect status of the user's eye 55 to indicate an out of eyebox (OOB) condition. The state of eye 55 of user 80 with respect to eyebox 82 can be reported by eye tracker processor 231 to sensor data processor 230, where it can be accessed by power control processor 210.

Power control processor 210 is configured to determine whether a power control condition is met within vehicle 10 based on the state of eye 55 or user 80 either alone, or in combination with one or more states sensed by other sensors. If a power control condition is met processor 210 is configured to determine a power control action for controlling one or more illumination sources 111, 112, 113 and 114. In some implementations, processor 210 is configured to send corresponding power control commands to one or more light source controllers 202, 204, 206, 208 respectively to control the corresponding light sources 111, 112, 113 and 114.

Vehicle 10 can also include a head tracking device (not depicted) in addition to, or instead of eye tracking device 25. For example, a head tracking device can contain RGB cameras, an infrared projector and detectors that map depth through either structured light or time of flight calculations. These can be used to perform real-time body skeletal detection, including head position and orientation. In those implementations, the head tracking device can detect whether the user's head is substantially out of eyebox 82.

Figure 3:
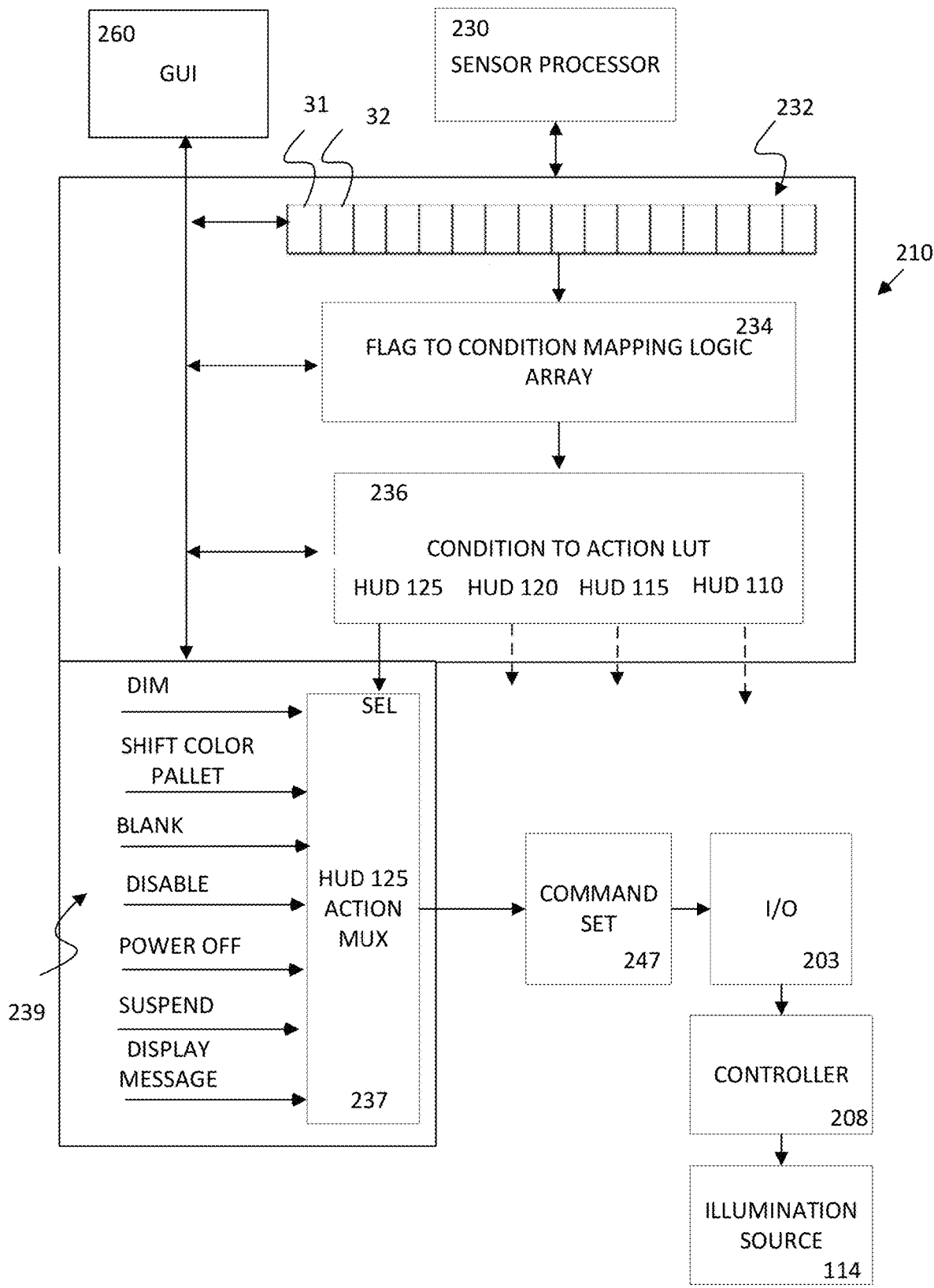
FIG. 3 is a block diagram of an example processor architecture according to the disclosure.

FIG. 3 is a block diagram of one example implementation of processor 210 of apparatus 200. Processor 210 comprises flag register 232, condition logic array 234, first look-up table 236 and second look up table 237. In one example implementation, apparatus 200 includes a human machine interface (HMI), e.g., a graphical user interface (GUI) 260 or the like. GUI 260 can be configured to communicate with processor 210 to access look up tables 236, 237 to allow a user to configure mappings of flags of register 232 in accordance with user-defined conditions, and also to map user-defined conditions to power control actions. In some implementations processor 210 implements GUI 260 by providing application code and an application program interface (API) that can be delivered to a device of a user, to allow the user to configure the mappings in accordance with user-defined conditions.

In the example implementation shown, processor 210 receives sensor data from sensor processor 230. In other implementations processor 210 can include sensor processor 230. Sensor processor 230 can be configured to pre-process sensor outputs to provide indications of status of vehicle 10 and its occupants in terms of state indications that can be stored in a register or other memory structure.

To account for a wide variety of conditions under which a power control action is desired, processor 210 includes a register 232. Register 232 stores state indications, or 'flags' set in accordance with test outcomes provided by respective sensors disposed throughout vehicle 10. Each flag can correspond to one or more bits that can be set or cleared to indicate a particular sensed state as reported by a vehicle sensor.

Apparatus 200 is configured to define power control conditions, i.e., conditions under which a power control action will be taken, using flag combinations. In other words, instead of relying on a single sensor for a conclusion as to whether a condition is met, indications from more than one sensor can be used to define a condition for taking a power control action. In that case, a combination of flags can be specified for each HUD to indicate different sensed states that define a power control condition which must be met in order for a power control action to be taken for a HUD.

In addition to defining power control conditions, flag register 232 can set a flag to indicate a type of vehicle, e.g., an internal combustion engine (ICE) vehicle or a battery electric vehicle (BEV). Flag register 232 can also include a power management override bit. The power management override bit can be set under conditions in which one or more of the HUD displays is required (or desired) to remain active regardless of sensed vehicle states. For example, a camera or light meter can be used to detect image testing of a HUD information plane. In that case the power management override flag can be set for that information plane. Detection of a set power management override flag for any HUD will result in suspension of power management actions for that HUD until the flag is cleared. As another example, a 'power management override flag can be set to define a condition under which a HUD can be forced to an ON state in order to be ready to display driver information, particularly regulatory required information functional safety (FuSa) related information and alerts.

Certain situations place constraints on the extent to which a power control action can be taken. Flag settings can be used to enforce the constraints. For example, actions to dim the display to save power can be defined by sensors that indicate a Federal test set-up is to be performed, e.g., to measure HUD color, brightness, and uniformity. In instances in which a power control action such as power removal or dimming can be taken for a HUD, and regulatory information is being displayed on that HUD, the processor can redirect the information from the HUD to be acted upon to a traditional display or the center touch panel.

As another example, if a front passenger seat 12 (see FIG. 2A) is occupied by a child seat, HUD 125 (see FIG. 1) would not be of use. In that case a power control condition for controlling illumination source 114 of HUD 125 can be defined by specifying a negative result from a front passenger seat sensor test and a negative result from a LIDAR occupancy sensor, testing occupancy of the front passenger seat. A first flag 31 of flag register 232 can be configured to store results of the front passenger seat tests and a flag 32 can be configured to store results of the LIDAR occupancy test.

Indicia, e.g., a combination of bits signifying a particular condition associated with flags 31 and 32 can be configured in condition logic 234. In the simplified example of FIG. 3 condition logic 234 comprises logic gates arranged to implement specified Boolean logic functions. Thus, e.g., condition logic 234 can be configured to output the indicia signifying the associated power control condition is met for HUD 125 whenever flag 31 AND flag 32 are positive.

Table 1 shows example flag states mapped to corresponding power control conditions, and power control conditions mapped to corresponding actions.

TABLE 1

| FLAGS | CONDITION | ACTION |
|---|---|---|
| Eyes OOB = 1 Timer = Tset | Eyes out of eyebox for longer than a predetermined time | Extinguish Illumination Source |
| Bev = 1 Charging = 1 | Batter powered vehicle is charging | Suspend power saving actions |
| Veh ICE = 1 Veh ON = 0 | Conventional internal combustion engine not running | Remove power to all HUDs |
| Pass seat occupied = 0 | No passenger | Remove power to pass TD HUD |
| Pass seat swiveled = 1 | Passenger not viewing HUD | Remove power to pass HUD |
| Child seat = 1 | No adult passenger | Remove power to Pass TD HUD |
| Autonomous = 1 Occupants = 0 | No occupants | Remove power to all HUDs |
| User head OOB = 1 | User not viewing HUD | Dim user HUD illumination source |

LUT 236 maps each condition met indication provided by logic array 234 to a corresponding power control action. Power control actions 239 can include, e.g., dimming, shifting a color palette, blanking, disabling, removing power, suspending, displaying a message, blanking, and any other power control action. As shown in Table 1, power control actions can also include extinguishing an illumination source, dimming an illumination source, suspending power saving actions, removing power to all HUDs and removing power to a passenger HUD.

For example, for HUD 125 having flag condition 31 AND 32 met, the associated condition indicia can be provided on a SEL line of multiplexer implementing look up table 237. The indicia on the select line will select pass an action index or vector 239 to memory 240 to point to a HUD command set corresponding to the selected action. In the example implementation shown in FIG. 1, the corresponding command set is provided to a controller, e.g., one of controllers 202, 204, 206, 208 controlling illumination sources 111-114. The sequence of commands in the command set, when executed by a corresponding controller, will control the corresponding illumination source to take the corresponding power control action.

For example, LUT 236 can map the indicia to a POWER OFF action for illumination source 114 of HUD 125. In that case, whenever flag 31 AND flag 32 are set (e.g., high), the indicia at the output of condition logic 234 will be provided to LUT 236. LUT 236 will output indicia that selects the POWER OFF input to multiplexer 237. The POWER OFF input is a vector, or address identifier that points to a set of one or more illumination control commands stored in memory 247. Processor 210 provides the indicated set of illumination control commands to controller 208. Controller 208 executes the commands to control current through illumination source 114. In that manner, processor 210 controls power consumption by HUD 125.

Processor 210 communicates with command set memory 247 to retrieve a command set corresponding to a power control action. Processor 210 is configured to send the corresponding commands from command set memory 240 to controller 208 via a communication link, e.g., I/O port 242. Controller 208 controls illumination source 114 in accordance with the commands in the command set.

In one implementation HUD light sources 111-114 comprise Digital Light Projectors (DLP)® including projector controllers which can be, e.g., processor structures or alternatively DLP® control ASICs. In such implementations, processor 210 can be configured with an inter-integrated circuit (I2C) communication interface to each of HUD light sources 111-114 to provide projector control commands which, when executed by a controller of a DLP projectors will cause the projector to take the corresponding power control action.

For example, many DLP® projectors include controllers with built in driver functions to control different types of solid-state illumination (SSI) systems. In some implementations two types of commands, or control signals, can be sent to the controllers of illumination sources 111-114. The first type is Enable strobes. Enable strobes are for turning the red, green and blue light emitting diodes (LEDs) ON/OFF independently. The second type is current control commands or signals which are defined for driving a specified illumination source with specified levels of current. The current levels can be specified by processor 210, e.g., by sending a 'set current' command to the controller of the illumination source.

In DLP® projector embodiments of HUD illumination sources 111-114, command sets include commands for current control of general pulse width modulation (PWM) based, Power Management IC (PMIC) control. For example, a 'Set Illumination Enable' command can be used to turn the illuminators ON or OFF. The display can be frozen using an 'Enable Freeze' command. A blank curtain can be displayed, or illuminators can be turned off using the 'Set Illumination Enable' command.

Upon reading this specification, those of ordinary skill will appreciate a variety of suitable equivalent electronic and computer hardware components and arrangements can be equivalent to the arrangement illustrated in FIG. 3. All such arrangements and equivalents are intended to remain within the scope of the disclosure.

Figure 4:
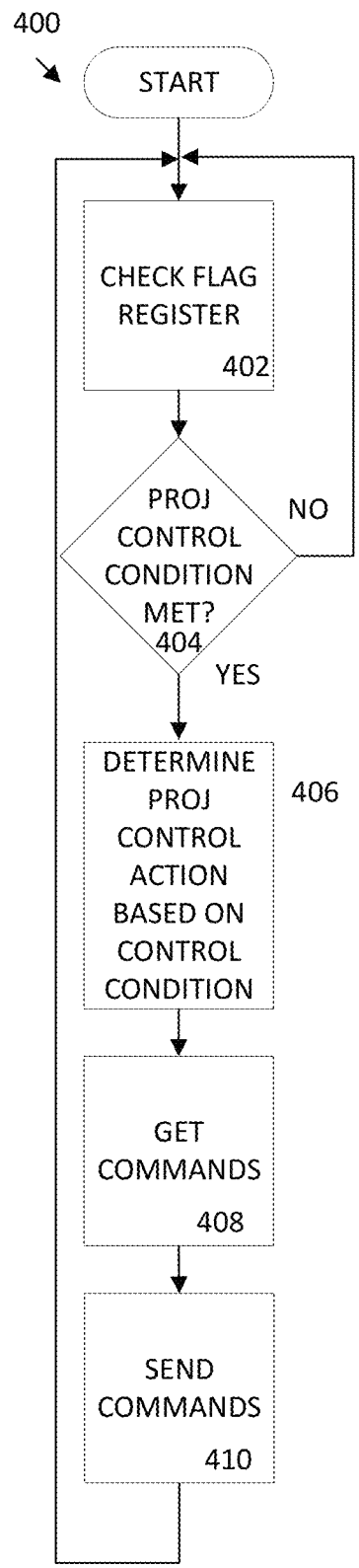
FIG. 4 is a flowchart of an example method for controlling HUD power according to the disclosure.

FIG. 4 is a flowchart of a process 400 for managing power consumption in a vehicle HUD system such as that illustrated in FIG. 1. At block 402, flag register 232 is checked for flag settings. At block 404 a determination is made as to whether a power control condition is met. If not, the method returns to block 402 and repeats the check flag register action until a power control condition is met at block 404. In that case the method proceeds to block 406 to determine a power control action corresponding to the power control condition. At block 408 control commands corresponding to the power control action are retrieved. At block 410 the power control commands are sent to the corresponding controller. The controller executes the commands whereby the power control action is taken.

FIGS. 5-11 are flowcharts of methods for setting flags of flag register 232 according to the disclosure. Of course, the disclosure is not limited to any particular number of flags in the flag register 232, or by number or type of sensors, or by number or nature of power control conditions. Flag register 232 can store any number of flags for any number or type of vehicle sensor. Likewise, the disclosure is not limited to the particular power control conditions described herein. Upon reading this disclosure, those of ordinary skill will appreciate many additional power control conditions can be defined in terms of various flag settings. All such variations are intended to remain within the scope of the disclosure.

Figure 5:
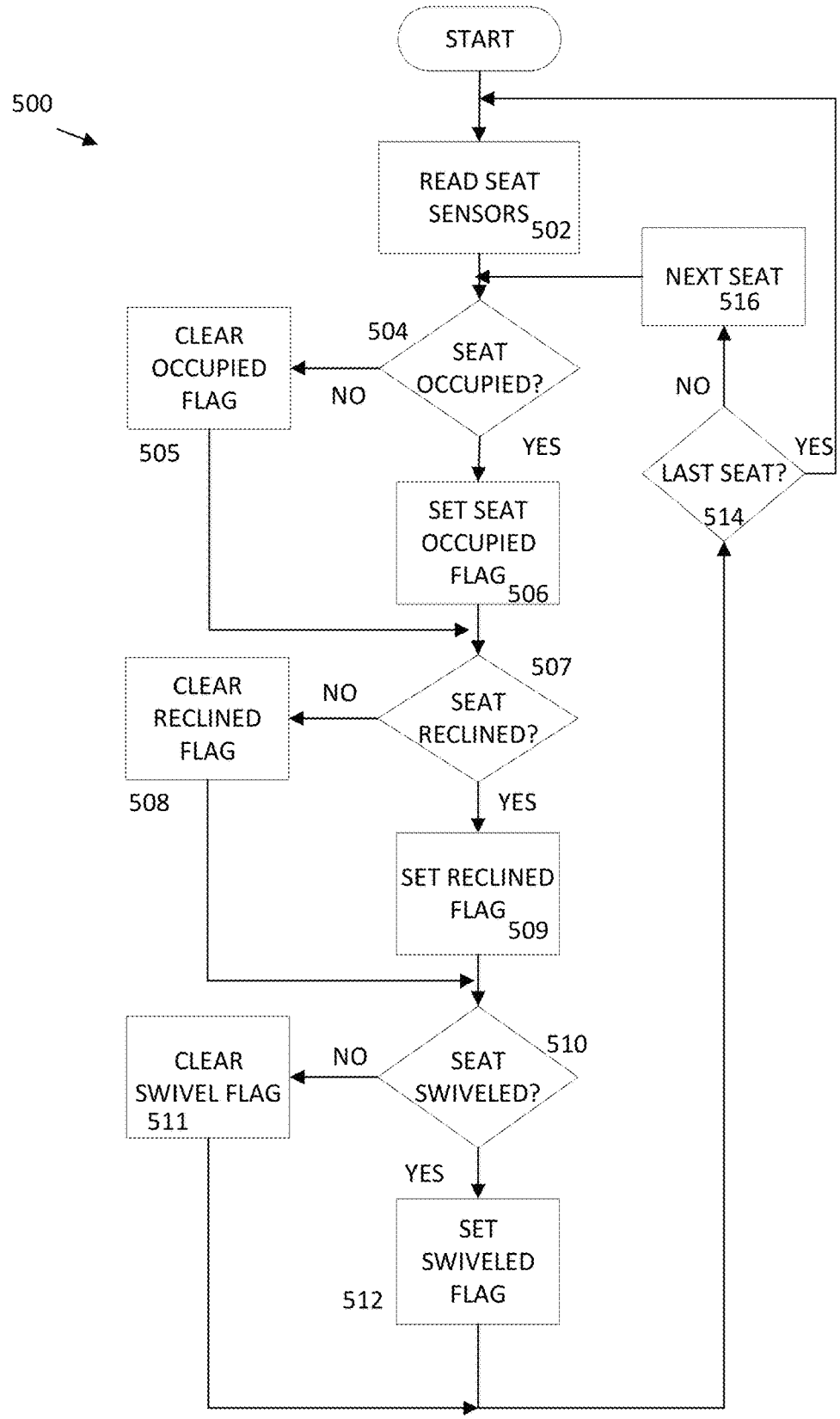
FIG. 5 is a flowchart of an example method for indicating seat states according to the disclosure.

FIG. 5 is a flowchart of an example process 500 of setting seat sensor flags according to the disclosure. As discussed above, the specific sensors and conditions set forth in this example are not limiting. They reflect an example implementation in a specific context. For example, some vehicles may have seats that can recline, but they cannot swivel. In those implementations there would not be a sensor for a swivel state. Also, there could be a sensor for a different state, e.g., transmission status. The specifics of any example described herein with respect to particular type of sensor or sensed condition are not intended to limit the scope of the disclosure.

At block 502 seat sensors are read. For a first seat, at block 504 a determination is made as to whether the first seat is occupied, based on the seat occupancy sensor readings. If the seat sensor readings indicate the seat is occupied, the seat occupied flag in flag register 232 is set at block 506. If the sensor readings indicate the seat is not occupied, the seat occupied flag in flag register 232 is cleared at block 505.

At block 507 a determination is made based on the seat recline sensor, as to whether the seat is reclined. If the sensor indicates the seat is recline, the seat reclined flag is set at block 509. If the sensor indicates the seat is not reclined, the seat reclined flag is cleared at block 508.

At block 510 a determination is made as to whether the seat is swiveled at block 510. If the seat sensor indicates the seat is swiveled, the seat swiveled flag is set at block 512. If the seat sensor indicates the seat is not swiveled, the seat swiveled flag is cleared at block 511.

After the seat position is checked in the manner described above, a determination is made at block 514 as to whether the current seat was the last seat to be checked. If the current seat was the last seat to be checked, the 'read seat sensors' action of block 502 is repeated and the process repeats for the next seat. When the last seat is checked as per block 514, the action of reading the seat sensors at block 502 is performed, and the process is repeated.

Figure 6:
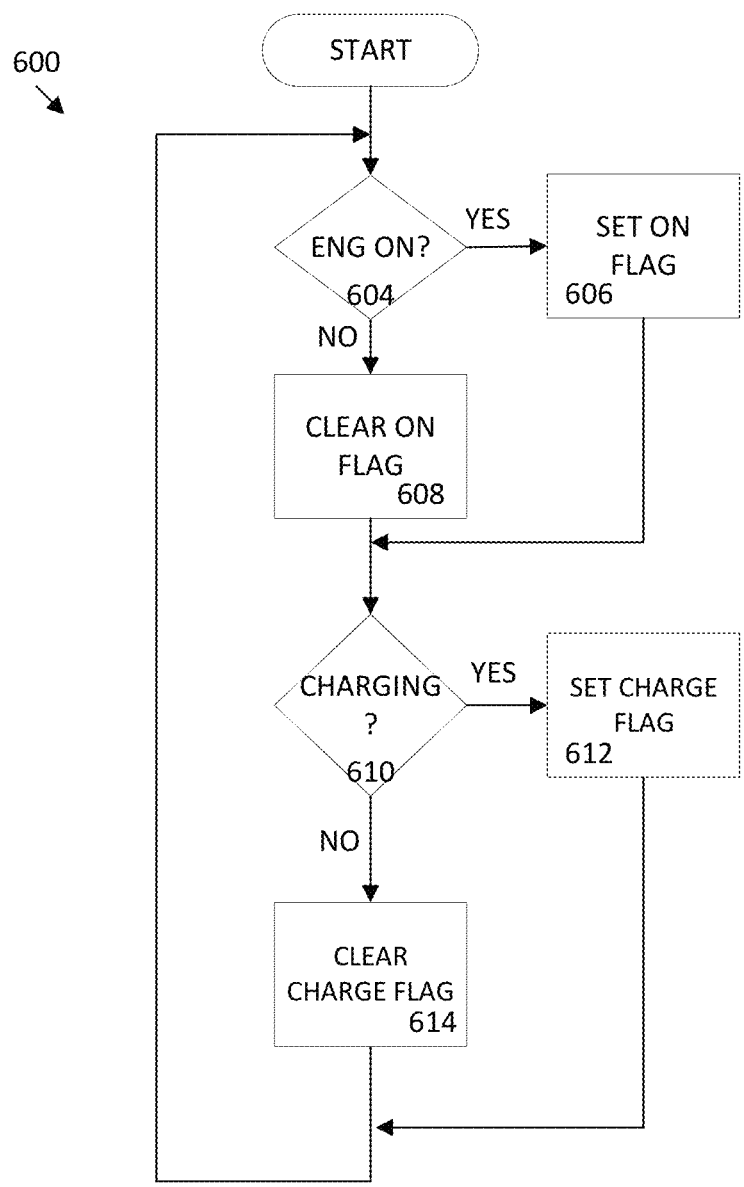
FIG. 6 is a flowchart of an example method for indicating vehicle power states according to the disclosure.

FIG. 6 is a flowchart illustrating a process for setting engine or motor status flags of flag register 232. At block 604 a determination is made as to whether the engine or motor is energized. If so, the engine ON flag is set at block 606. If not, the engine ON flag is cleared, i.e., set to 0 at block 608. At block 610 a determination is made as to whether the engine or motor is charging. If so, a charging flag is set at block 612. If not, the charging flag is cleared or set to zero at block 614.

Figure 7:
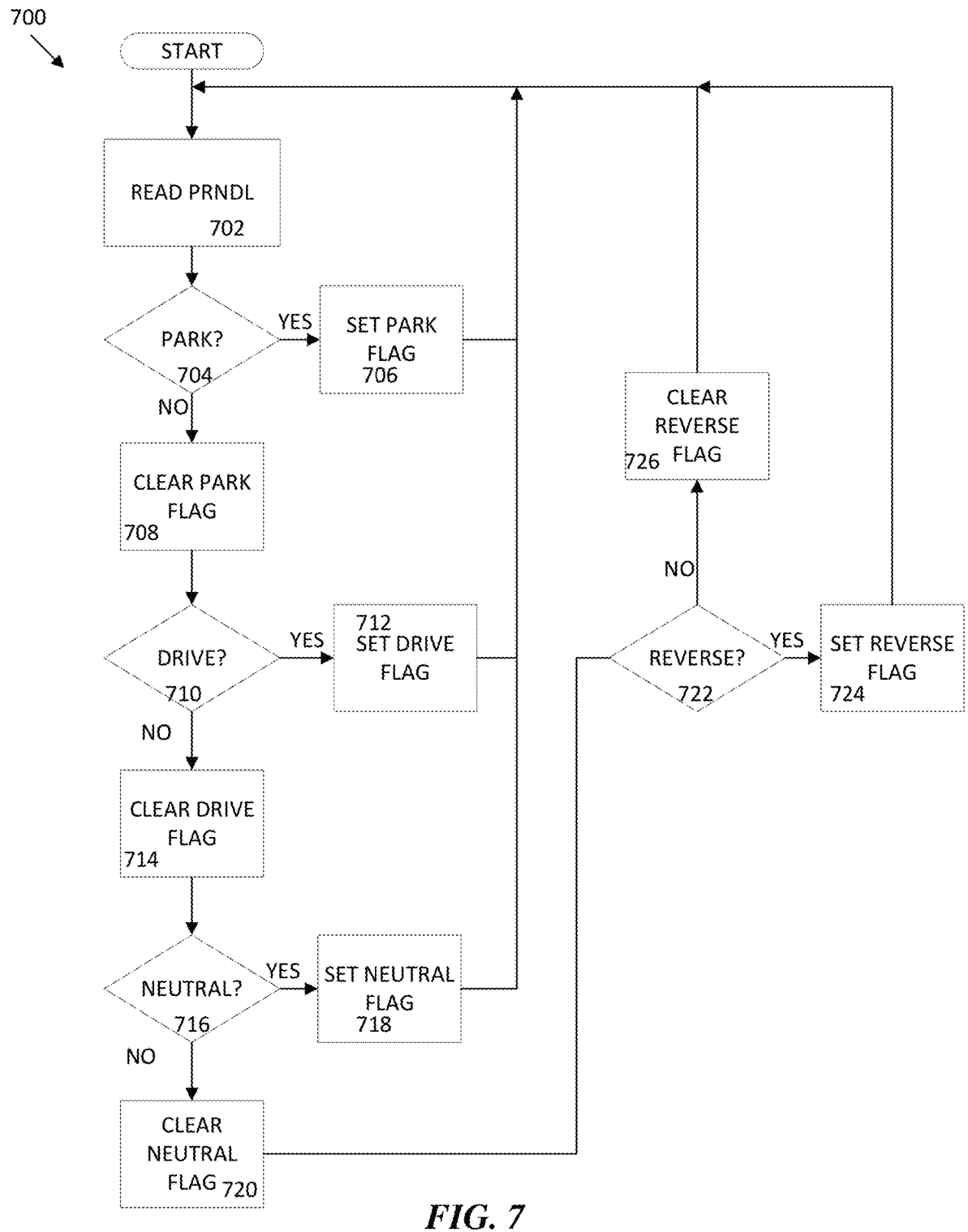
FIG. 7 is a flowchart of an example method for indicating transmission states of a vehicle according to the disclosure.

FIG. 7 is a flowchart of a method for setting vehicle transmission status flags according to the disclosure. At block 702 PRNDL transmission state indications are tested. At block 704 a determination is made as to whether the vehicle is in Park. If the vehicle is in Park a Park flag is set at block 706 and the method returns to test the PRNDL transmission status at block 702. If not, the Park flag is cleared at block 708 and the method proceeds to block 710. At block 710 a determination is made as to whether the vehicle is in Drive. If so, a Drive flag is set at block 712 and the method returns to test the PRNDL transmission status at block 702. If not, the Drive flag is cleared at block 714 and the method proceeds to block 716.

At block 716 a determination is made as to whether the vehicle is in Neutral. If so, the Neutral flag is set at block 718 and the method returns to test the PRNDL transmission status at block 702. If not, the Neutral flag is cleared at block 720 and the method proceeds to block 722. At block 722 a determination is made as to whether the vehicle is in Reverse. If so, a Reverse flag is set at 724 and the method returns to test the PRNDL transmission status at block 702. If not, the Reverse flag is cleared at 726 and the method returns to test the PRNDL transmission status at block 702.

Figure 8:
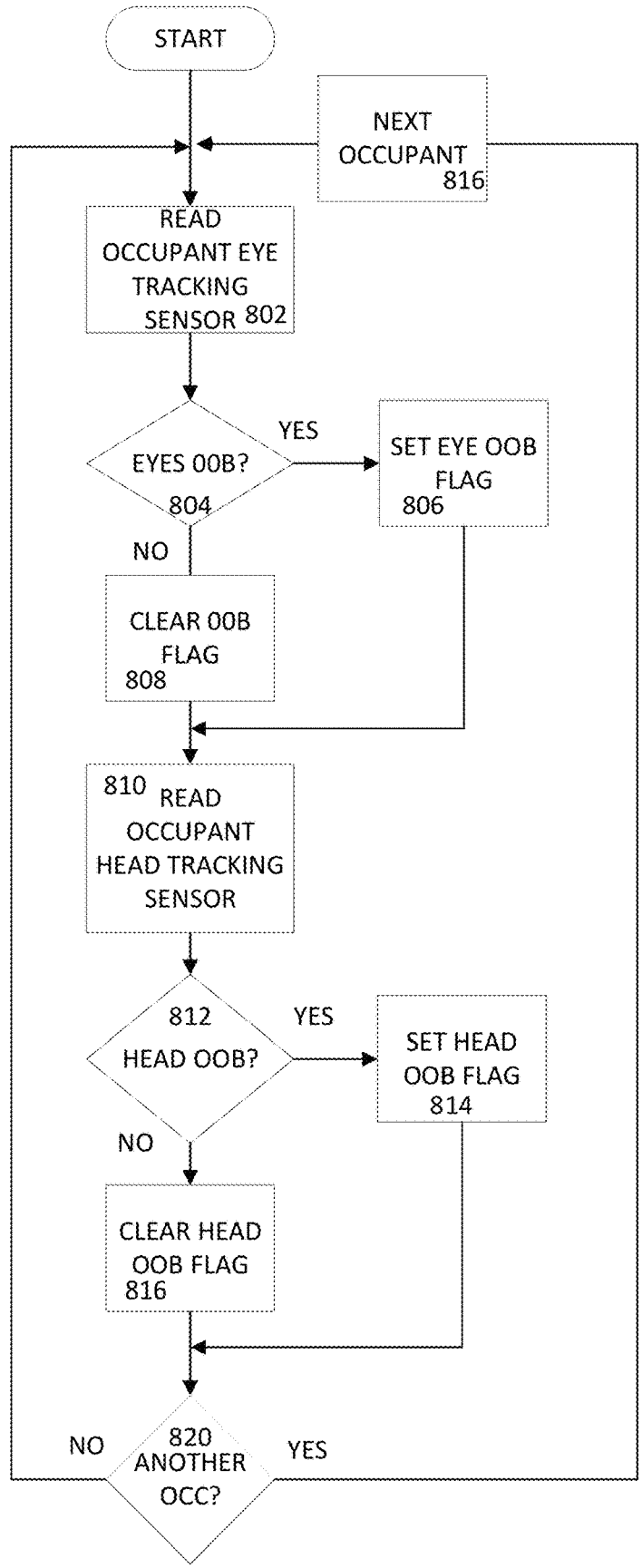
FIG. 8 is a flowchart of an example method for indicating an occupant eye or head position according to the disclosure.

FIG. 8 is a flowchart of a method for setting head and eye position flags according to the disclosure. At block 802 an occupant eye tracking sensor is read. Any suitable eye tracking sensor can sense the occupant's eye state and provide an indication of the state. Alternatively, or in addition, a head tracking sensor could be used to provide an indication of a state of an occupant's head.

At block 804 a determination is made as to whether the occupant's eyes are out of the eyebox (OOB), based on the indication provided by the eye tracking sensor. If so, the OOB flag is set at 806 and the method proceeds to block 810. If not the OOB flag is cleared at block 808 and the proceeds to block 810.

At block 810 a determination is made as to whether the occupant's head is OOB. If so the Head OOB flag is set at block 814 and the method proceeds to block 820. If not the Head OOB flag is cleared at block 816 and the method proceeds to block 820. At block 820 a determination is made as to whether there is another occupant for whom eye and head tracking is performed. If so, the method gets the next occupant record at block 816 and the method repeats. If there is no other occupant at block 820 the method returns to block 802 to read the occupant eye tracking sensor and the method repeats.

Figure 9:
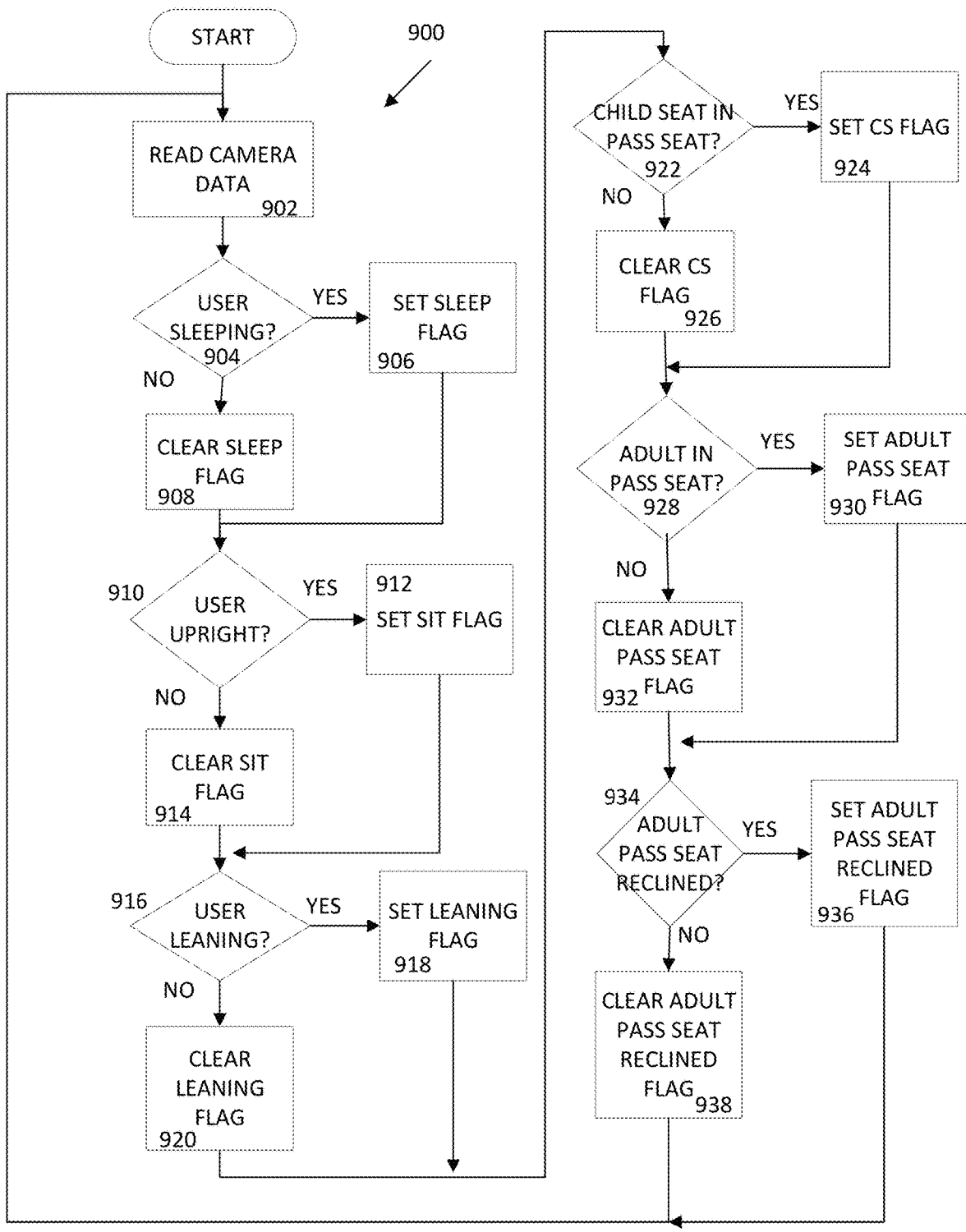
FIG. 9 is a flowchart of an example method for indicating passenger and vehicle states according to the disclosure.

FIG. 9 is a flowchart of a method for setting vehicle user status flags indicators according to the disclosure. At block 902 camera data is read. At block 904 a determination is made as to whether a user, e.g., a passenger, is sleeping. If so, the sleep flag is set at block 906 and the method proceeds to block 910. If not, the sleep flag is cleared at block 908 and the method proceeds to block 910. At block 910 a determination is made as to whether the user is sitting upright. If so, the sit flag is set at block 912 and the method proceeds to block 916. If not, the sit flag is cleared at block 914 and method proceeds to block 916.

At block 916 a determination is made as to whether the user is leaning against a vehicle door. If so, the leaning flag is set at block 918 and the method proceeds to block 922. If not, the leaning flag is cleared at block 920 and the method proceeds to block 922. At block 922 a determination is made as to whether there is a child seat disposed upon the passenger seat. If so, a child seat flag is set at block 924 and the method proceeds to block 928. If not, the child seat flag is cleared at block 926 and the method proceeds to block 928.

At block 928 a determination is made as to whether an adult is in the passenger seat. If so, the adult passenger seat flag is set at block 930 and the method proceeds to block 934. If not, the adult passenger seat flag is cleared at block 932 and the method proceeds to block 934. At block 934 a determination is made as to whether the passenger seat is reclined. If so, the passenger seat reclined flag is set at block 936 and the method returns to block 902 to read the camera data and repeat the method. If not, the passenger seat reclined flag is cleared at block 938 and the method returns to block 902 to read the camera data and repeat the method.

Figure 10:
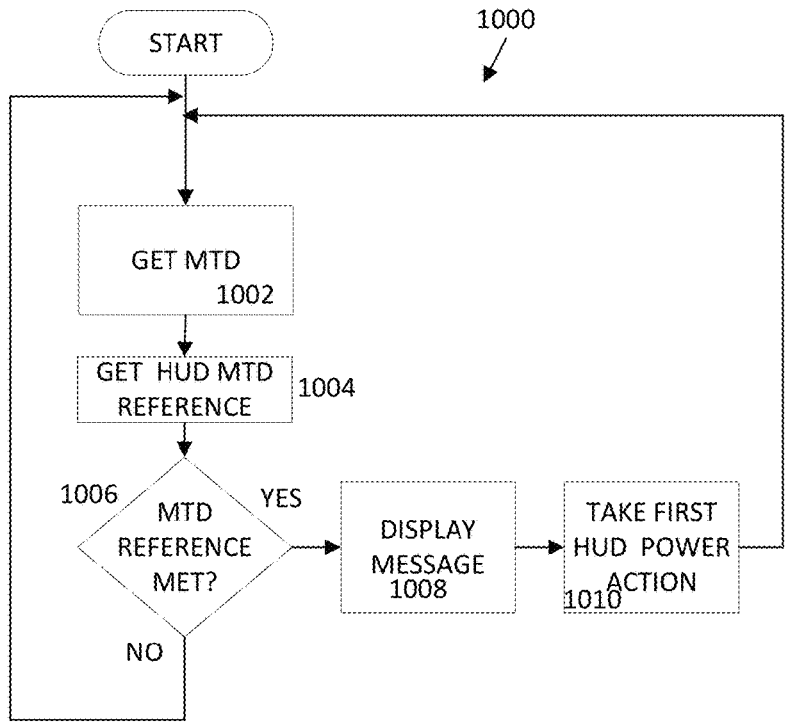
FIG. 10 is a flowchart of an example method for indicating distance (i.e., miles) to destination (MTD) status according to the disclosure.

FIG. 10 is a flowchart of a method 1000 for managing power consumption according to the disclosure. According to method 1000 a power management action is taken when a vehicle is within a user-selectable or predetermined threshold number of miles to its destination.

At block 1002, miles to destination (i.e., a distance of a current location of the vehicle from a destination location) is determined based, e.g., on trip settings, odometer readings and/or GPS data in one example. At block 1004, a reference number of miles to destination setting is obtained. For example, in some implementations a user can specify at what distance from the destination the user wishes the apparatus to start taking specified power control actions. In that case the apparatus can be configured to compare the user's setting to GPS or map data indicating a threshold number of miles to destination. At block 1006 a determination is made as to whether the vehicle is within the threshold number of miles to destination. If so, the method proceeds to block 1008. At block 1008 a message is displayed on the HUD advising the user or other viewer that a power management action will be taken. At block 1010 the power management action is taken, and the method returns to block 1002. If the miles-to-destination (MTD) threshold number of miles is not met, i.e., the vehicle is not within the predetermined number of miles to its destination, in which case the method returns to block 1002 and repeats until the vehicle is within the reference number of miles to its destination.

Figure 11:
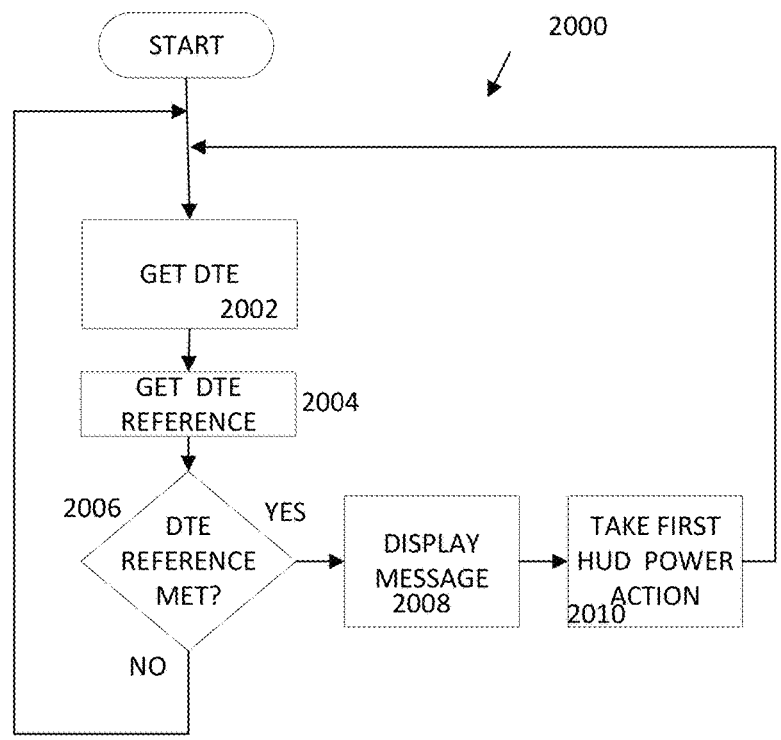
FIG. 11 is a flowchart of an example method for indicating distance to empty (DTE) according to the disclosure.

FIG. 11 is a flowchart of a method for managing power consumption according to the disclosure. At 2002 a distance to empty (DTE) is calculated. At 2004 a reference DTE is obtained. At 2006 the DTE is compared to the reference DTE to determine whether the vehicle is within the predetermined distance to empty. If so, the method proceeds to block 2008 where a message is displayed advising the user or other viewer that a power control action will be taken. For example, a message such as "CONTENT SUSPENDED TO SAVE POWER DUE TO LOW DTE" is displayed. At block 2010 the power control action is taken and the method proceeds to block 2002 where it repeats.

Computer-executable instructions that configure processor 210 to perform the functions and methods disclosed herein are machine code instructions. These may be provided based on computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium includes any medium that participates in providing data (e.g., instructions), which may be read by a computer. Such a medium may take many forms, including, but not limited to, non-transitory computer readable media (NTCRM), non-volatile media, volatile media, etc. Non-volatile media include, for example, optical or magnetic disks and other persistent, non-transitory memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. It is to be understood that the above description is intended to be illustrative and not restrictive. Many embodiments and applications other than the examples provided would be apparent to those of skill in the art upon reading the above description. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An apparatus comprising:
a processor;
a memory coupled to the processor, the memory storing processor-executable instructions that configure the processor to:
receive sensor data provided by a seat recline sensor and a seat swivel sensor disposed in a vehicle equipped with head-up displays (HUDs);
store state indications including at least a seat recline state and a seat swivel state based on the received sensor data;
based on the seat recline state and the seat swivel state, determine whether a power control condition is met for a HUD that is one of the HUDs with which the vehicle is equipped;
upon determining that the power control condition is met for the HUD:
determine a corresponding power control action for the HUD including at least reducing power consumption by the HUD;
retrieve a set of stored power control commands corresponding to the power control action for the HUD; and
send the set of power control commands to the HUD to control the HUD to take the corresponding power control action.

2. The apparatus of claim 1, further comprising a register configured to store the provided state indications as set or cleared flags according to the indicated states.

3. The apparatus of claim 2, further comprising a logic unit configured to map each of a predetermined number of possible flag patterns in the register to a corresponding power control condition of a predetermined number of possible power control conditions for controlling power to the HUD.

4. The apparatus of claim 1, further comprising a first look up table configured to map each of a predetermined number of possible HUD power control conditions to one of a predetermined number of possible HUD power control actions for the HUD.

5. The apparatus of claim 4, comprising a second look up table configured to map each of the predetermined number of possible HUD power control actions to a corresponding one of a predetermined number of power control command sets.

6. The apparatus of claim 1, comprising one or more input/output ports communicatively coupled to one or more HUD input/output ports for sending power control command sets to the HUDs.

7. The apparatus of claim 3, wherein the logic unit is user programmable, and the apparatus further comprises a user interface configured to receive a user defined control condition as a combination of set and cleared flags, and to map the control condition to a corresponding user-selected one of the HUD power control conditions.

8. The apparatus of claim 7, wherein at least one HUD power control action is delayed by a user-configurable delay time.

9. The apparatus of claim 1, wherein the processor is configured to determine that a first power control condition is met when both the seat recline state is reclined and the seat swivel state is swiveled, wherein the corresponding power control action for the HUD is to remove power to the HUD; and
wherein the processor is configured to determine that a second power control condition is met when only the seat recline state is reclined or only the seat swivel state is swiveled, wherein the corresponding power control action for the HUD is to dim the HUD.

10. A method comprising:
receiving sensor data provided by a seat recline sensor and a seat swivel sensor disposed in a vehicle equipped with a head-up display system (HUD) comprising HUDs;
storing HUD power state indications including at least a seat recline state and a seat swivel state based on the received sensor data;
based on the seat recline state and the seat swivel state, determining whether a HUD power control condition is met;
upon determining that a HUD power control condition is met:
determining a corresponding HUD power control action including at least reducing power consumption by the HUD;
retrieving a set of stored HUD power control commands corresponding to the HUD power control action; and
sending the set of HUD power control commands to a HUD to control the HUD to take the corresponding HUD power control action.

11. The method of claim 10, comprising: storing the state indications in a flag register as set or cleared flags.

12. The method of claim 11, comprising mapping each of a predetermined number of possible flag patterns in the flag register to a corresponding HUD power control condition of a predetermined number of possible imager power control conditions for controlling power to the HUD.

13. The method of claim 12, further comprising mapping each of the predetermined number of possible HUD power control conditions to one of a predetermined number of possible HUD power control actions for each of the HUDs.

14. The method of claim 13, comprising mapping each of the predetermined number of possible HUD power control actions to a corresponding one of a predetermined number of power control command sets.

15. The method of claim 14, comprising sending power control command sets to one or more of the HUDs.

16. The method of claim 15, comprising:
- receiving a user defined control condition as a combination of set and cleared flags; and
- mapping the control condition to a corresponding user selected power control condition of the plurality of HUD power control conditions.

17. The method of claim 16, comprising delaying at least one HUD power control action by a user-configurable delay time.

18. The method of claim 10, comprising:
- determining that a first power control condition is met when both the seat recline state is reclined and the seat swivel state is swiveled, wherein the corresponding power control action for the HUD is to remove power to the HUD; and
- determining that a second power control condition is met when only the seat recline state is reclined or only the seat swivel state is swiveled, wherein the corresponding power control action for the HUD is to dim the HUD.

* * * * *